(12) United States Patent
Desoli

(10) Patent No.: US 6,907,519 B2
(45) Date of Patent: Jun. 14, 2005

(54) SYSTEMS AND METHODS FOR INTEGRATING EMULATED AND NATIVE CODE

(75) Inventor: Giuseppe Desoli, Watertown, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 10/100,874

(22) Filed: Mar. 19, 2002

(65) Prior Publication Data

US 2003/0101334 A1 May 29, 2003

Related U.S. Application Data

(60) Provisional application No. 60/334,234, filed on Nov. 29, 2001.

(51) Int. Cl.[7] ............................................. G06F 9/455
(52) U.S. Cl. ...................................................... 712/227
(58) Field of Search .................................. 712/227, 244

(56) References Cited

U.S. PATENT DOCUMENTS

| | | | |
|---|---|---|---|
| 5,768,593 A | | 6/1998 | Walters et al. |
| 5,781,758 A | * | 7/1998 | Morley .......................... 703/23 |
| 5,907,708 A | * | 5/1999 | Hohensee et al. ........... 712/244 |
| 5,953,520 A | * | 9/1999 | Mallick ........................ 703/26 |
| 5,974,549 A | | 10/1999 | Golan |
| 6,163,764 A | * | 12/2000 | Dulong et al. ................ 703/26 |
| 6,275,938 B1 | | 8/2001 | Bond et al. |
| 6,385,718 B1 | * | 5/2002 | Crawford et al. ........... 712/227 |
| 6,480,952 B2 | * | 11/2002 | Gorishek et al. ........... 712/227 |
| 2003/0093650 A1 | | 5/2003 | Desoli |
| 2003/0101292 A1 | | 5/2003 | Fisher et al. |
| 2003/0101330 A1 | | 5/2003 | Duesterwald et al. |
| 2003/0101381 A1 | | 5/2003 | Mateev et al. |
| 2003/0101431 A1 | | 5/2003 | Duesterwald et al. |
| 2003/0101439 A1 | | 5/2003 | Desoli et al. |
| 2003/0182653 A1 | | 9/2003 | Desoli et al. |
| 2003/0192035 A1 | | 10/2003 | Duesterwald ald |
| 2004/0025165 A1 | | 2/2004 | Desoli et al. |

OTHER PUBLICATIONS

Application entitled "System and Method for Facilitating Profiling an Application" by Fisher, et al.; assigned U.S. Appl. No. 10/606,867; filed on Jun. 26, 2003.

Bala, et al. "Dynamo: A Transparent Dynamic Optimization System."; pp. 1–12. Copyright 2000 ACM.

* cited by examiner

*Primary Examiner*—Eric Coleman

(57) ABSTRACT

Systems and methods for integrating emulated and native code are provided. One embodiment comprises a method for emulating code from an original computer system on a host computer system. Briefly described, one such embodiment comprises the steps of: fetching a program instruction associated with program code to be emulated on a host computer system; determining whether the program instruction is to be executed natively on the host computer system or is to be emulated on the host computer system; and if the program instruction is to be executed natively on the host computer system, emitting a native code fragment associated with the program instruction into a dynamic execution layer interface to be executed.

23 Claims, 9 Drawing Sheets

SYSTEMS AND METHODS FOR INTEGRATING EMULATED AND NATIVE CODE

CROSS-REFERENCE TO RELATED APPLICATION

This application claims priority to now abandoned U.S. provisional application entitled, "Systems and Methods for Integrating Emulated and Native Code," having Ser. No. 60/334,234, filed Nov. 29, 2001, which is entirely incorporated herein by reference.

FIELD OF THE INVENTION

This disclosure generally relates to emulation of an original computer system on a host computer system. More particularly, the disclosure relates to systems and methods for integrating emulated and native code.

BACKGROUND OF THE INVENTION

Operating system software and user application software are written to execute on a given type of computer system. That is, software is written to correspond to the particular instruction set in a computer system, i.e., the set of instructions that the system recognizes and can execute. If the software is executed on a computer system without an operating system, the software must also be written to correspond to the particular set of components and/or peripherals in the computing system.

Computer hardware (e.g., microprocessors) and their instruction sets are often upgraded and modified, typically to provide improved performance. Unfortunately, as computer hardware is upgraded or replaced, the preexisting software, which often is created at substantial cost and effort, is rendered obsolete. Specifically, in that the software was written for an instruction set of the original hardware, it contains instructions that a new host hardware will not understand.

Various solutions are currently used to deal with the aforementioned difficulty. One such solution is to maintain obsolete computer hardware instead of replacing it with the upgraded hardware. This alternative is unattractive for several reasons. First, a great deal of expense and effort is required to maintain such outdated hardware. Second, where the new hardware is more powerful, failing to replace the outdated hardware equates to foregoing potentially significant performance improvements for the computer system.

A further solution to the problem, and perhaps most common, it to simply replace all of the software each time the underlying hardware is replaced. This solution is equally unattractive, however, in view of the expense and effort required for such an endeavor as well as the learning curve associated with training the users of the previous software to use the new software.

Another potential solution to the problem is to provide a virtual machine environment in which the original software can be executed on a new host system. This solution has the advantage of neither requiring maintenance of outdated hardware nor complete replacement of the original software. Unfortunately, however, present emulation systems lack the resources to provide a hardware emulation for real world software applications due to the complexity associated with emulating each action of the original hardware. For example, to emulate a computer system for an actual program such as an operating system, the emulation system must be able to handle asynchronous events that may occur such as exceptions and interrupts. Furthermore, current systems are highly customized (e.g., are point solutions) and are therefore platform dependent.

From the foregoing, it can be appreciated that it would be desirable to have improved emulation systems.

SUMMARY

The present disclosure relates to systems and methods for integrating emulated and native code. One embodiment comprises a method for emulating code from an original computer system on a host computer system. Briefly described, one such embodiment comprises the steps of: fetching a program instruction associated with program code to be emulated on a host computer system; determining whether the program instruction is to be executed natively on the host computer system or is to be emulated on the host computer system; and if the program instruction is to be executed natively on the host computer system, emitting a native code fragment associated with the program instruction into a dynamic execution layer interface to be executed.

Another embodiment comprises an emulation program embodied on a computer-readable medium and configured to emulate an original computer system for which a program was written. Briefly described, one such embodiment comprises: logic configured to fetch a program instruction associated with program code to be emulated on a host computer system; logic configured to determine whether the program instruction is to be executed natively on the host computer system or is to be emulated on the host computer system; and logic configured to emit a native code fragment associated with the program instruction into a dynamic execution layer interface to be executed in the event the program instruction is to be executed natively on the host computer system.

Another embodiment of the present invention comprises a system for emulating code from an original computer system on a host computer system. Briefly described, in architecture, one such system comprises an emulator, a dynamic execution layer interface, and an application program interface that links the emulator and the dynamic execution layer interface. The emulator may be configured to fetch instructions associated with a program written to be executed on an original computer system. The emulator may comprise an emulation module configured to execute instructions by emulating the original computer system and a native code interceptor module configured to detect instructions that are to be executed natively instead of emulated. The dynamic execution layer interface comprises a core having at least one code cache in which code fragments may be cached and executed.

BRIEF DESCRIPTION OF THE DRAWINGS

The invention can be better understood with reference to the following drawings.

DETAILED DESCRIPTION

Disclosed is a system and method for integrating emulated and native code in a virtual machine environment. As is explained below, the integration of the native code with the code to be emulated is facilitated with a dynamic execution layer interface that is utilized via an application program interface (API). To facilitate description of the inventive system and method, example systems are discussed with reference to the figures. Although these systems are described in detail, it will be appreciated that they are provided for purposes of illustration only and that various modifications are feasible without departing from the inventive concept. After the description of the systems, examples of operation of the systems are provided to explain the manners in which system emulation can be facilitated.

Figure 1:
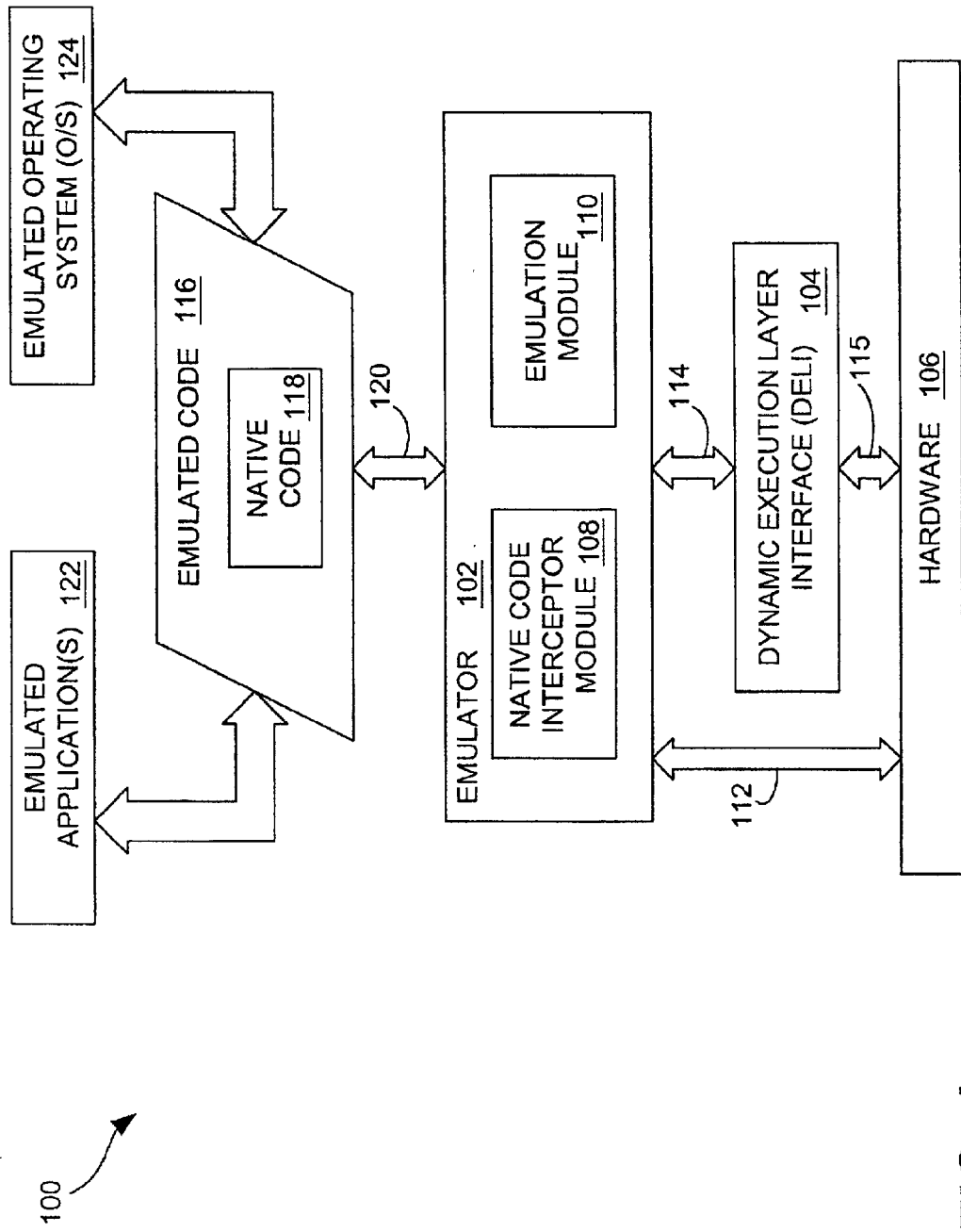
FIG. 1 is a block diagram of an embodiment of an emulation system according to the present invention for integrating native and emulated code in a virtual machine environment.
Figure 2:
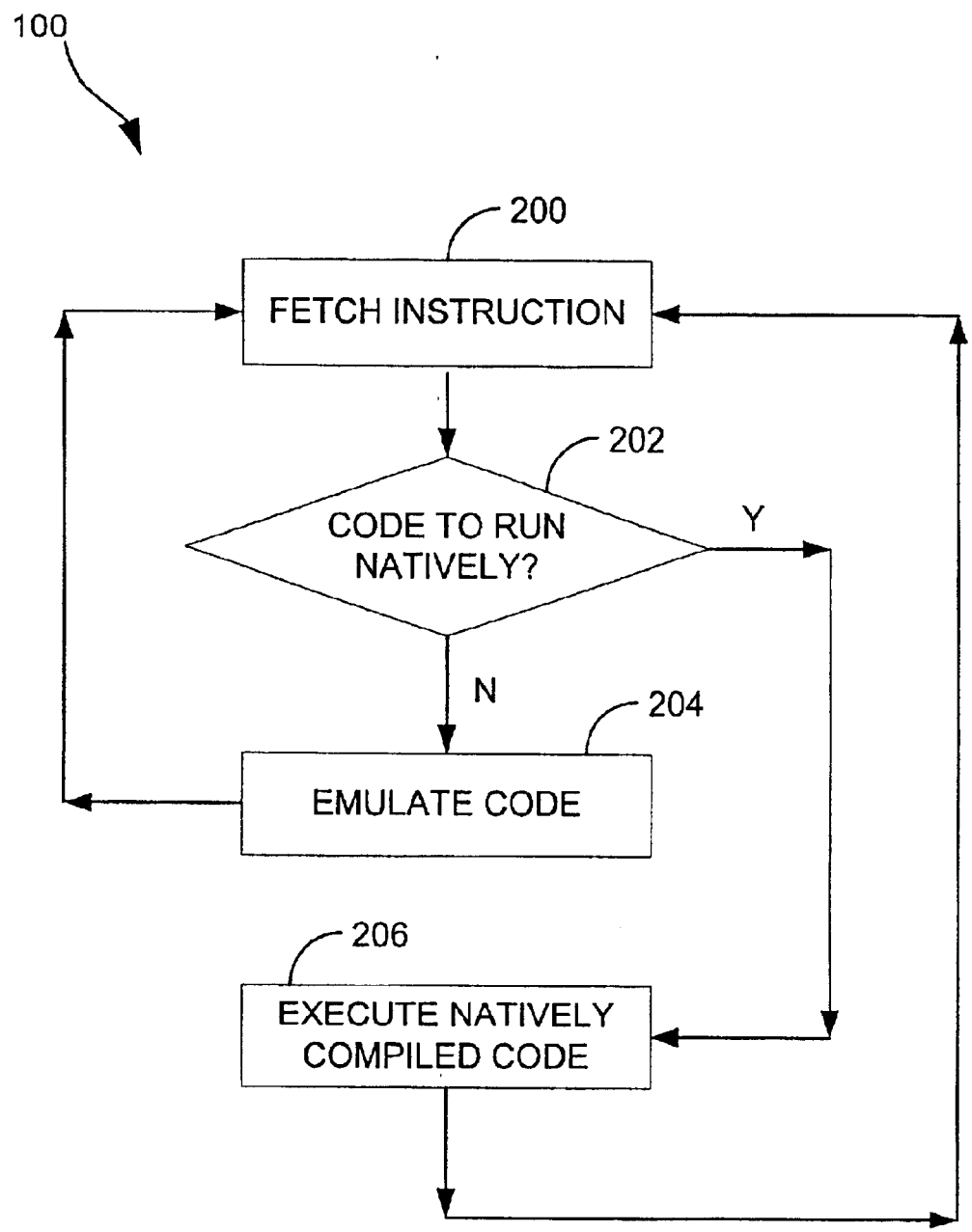
FIG. 2 is a flow diagram that generally illustrates the operation of the emulation system of FIG. 1.

Referring to FIGS. 1 and 2, an embodiment of an emulation system 100 according to the present invention, which is configured to integrate native and emulated code in a virtual machine environment, will be described. As described in more detail below, in general, emulation system 100 is configured to execute software written for a computer system, which is different from that of a host computer system, by emulating the original computer system in a virtual machine environment. By way of background, the original computer system, or "emulated system," may comprise a processor, such as a microprocessor, having one type of instruction set architecture (ISA), while the host computer system, or "native system," may comprise a different processor having another type of ISA. The ISA of a processor generally refers to the set or sequence of binary instruction codes that a particular type of processor executes to carry out software instructions. Software written for the emulated system is referred to as "emulated code" and software written for the native system is referred to as "native code." In order to execute the emulated code on the native system, an emulation system may be employed to implement what is referred to as a virtual machine environment.

Significantly, emulation system 100 is also configured to execute native code that is integrated with the emulated code. In the embodiment illustrated in FIG. 1, emulation system 100 comprises an emulator 102, a dynamic execution layer interface (DELI) 104, and hardware 106. Emulator 102 is linked to DELI 104 via interface 114, to hardware 106 via interface 112, and to an emulated application 122 and/or an emulated operating system 124 via interface 120. DELI 104 is linked to hardware 106 via interface 115.

Generally speaking, DELI 104 comprises a generic software layer written in a high or low level language that resides between applications (i.e., emulator 102), including or not including an operating system (O/S), and hardware to untie application binary code from the hardware. Through this arrangement, DELI 104 may provide dynamic computer program code transformation, caching, and linking services that can be used in a wide variety of different applications such as emulation, dynamic translation and optimization, transparent remote code execution, remapping of computer system functionality for virtualized hardware environments program, code decompression, code decrypting, etc. As described in more detail below, DELI 104 may provide its services while operating in a transparent mode, a nontransparent mode, or combinations of the two. In the transparent mode, DELI 104 automatically takes control of an executing program in a manner in which the executing program is unaware that it is not executing directly on computer hardware. In the nontransparent mode, DELI 104 exports its services through an application program interface (API) to the application (client), thereby enabling the application to control how DELI 104 reacts to certain system events.

Emulator 102 includes a native code interceptor module 106 and an emulation module 110. Generally speaking, emulation module 110 emulates the hardware of an emulated system. Accordingly, emulation module 110, from the perspective of a program executed by the emulation system 100, performs all of the actions that the original hardware would have performed during native execution of the program. One of ordinary skill in the art will appreciate that emulation module 110 may be configured in a variety of ways. For example, emulation module 110 may be implemented with any combination of an emulation functionality, an interpreter functionality, an emulator/translator functionality, and/or a just-in-time (JIT) compiler. Accordingly, emulation module 110 may implement an interpreter to provide emulation of the emulated system. As is generally known to persons having ordinary skill in the art, interpreters receive code, interpret it by determining the underlying semantics associated with the code, and carry out the semantic actions. An emulator/interpreter functionality may comprise an original system description that comprises the information about the instruction set of the original system hardware (i.e., that being emulated) that is needed to properly emulate the original system.

JIT compilers are configured to provide run time compilation (i.e., translation) of software. More particularly, JIT compilers provide binary translation of the program to be executed. In operation, a JIT compiler receives a representation of the program and translates it into an equivalent program (i.e., one having the same semantic functionality) for the target hardware of the host computer system. Similar to emulator/interpreter functionality, a JIT compiler comprises a system description that comprises information about the instruction set of the original system hardware. The system description, however, comprises the information the JIT compiler needs to properly translate code into the desired form.

As described in more detail below, native code interceptor module 108 is configured to detect native code 118 inserted within emulated code 116 and to execute the native code 118 on hardware 106 without the need for emulation. FIG. 2 is a flow diagram illustrating the general operation of emulating system 100. As shown by block 200, emulating system 100 fetches instructions corresponding to emulated code 116, which includes native code 118. At decision block 202, emulating system 100 determines whether the particular fetched instruction corresponds to code that is to be run natively on hardware 106. In other words, emulating system 100 is configured to detect native code 118. If the fetched instruction corresponds to emulated code 116, at block 204, emulating system 100 emulates the code. When emulating system 100 detects native code 118, however, at block 206, the code is run natively on hardware 106 without undergoing emulation, interpretation, translation, etc. Native code 118 may also be executed via DELI 104.

Although referred to as native code 118, it will be appreciated that native code 118 need not comprise the actual native code to be executed. As described in more detail below, native code 118 may comprise a "special" instruction (e.g. an illegal instruction in the emulated system) adapted to enable native code interceptor module 108 to determine that specified native code 118 is to be executed natively. For instance, this functionality may be implemented with a wrapper function, native libraries, and/or an interface configured to bridge calling conventions associated with the native system and the emulated system. One of ordinary skill in the art will appreciate that a variety of other known or later-developed programming conventions may be implemented. For example, an existing compiler toolchain for the emulated system may be integrated with an existing compiler toolchain for the native system. In this manner, postprocessors may produce, in both cases, wrappers that convert one convention (also known as RTA or Run Time Architecture) to the other. An application programmer may specify certain parts of, for example, an application program, to be executed natively on hardware 106. It may be advantageous for performance purposes to run certain portions of a computer program natively on hardware 106.

Consider the situation in which the native hardware 106 is very efficient in running certain kinds of applications in a manner that is faster than the emulated system and/or faster than emulating, interpreting, and/or translating the corresponding code. By way of example, the emulated application may comprise a media-based application, such as a video player. In this type of application, a very complex front-end graphical user interface (GUI) may be written in a familiar programming environment (i.e., SDK), while the media-processing portion of the application may be written to cooperate directly with the native hardware 106. In other words, the GUI-portion of the application may be written as emulated code 116 and the media-processing portion may be written as native code 118, which is integrated with the emulated code. As the media-based application is being executed by emulation system 100, the GUI-based code (emulated code 116) is emulated and executed on hardware 106 and the media-processing code is executed natively.

Figure 3:
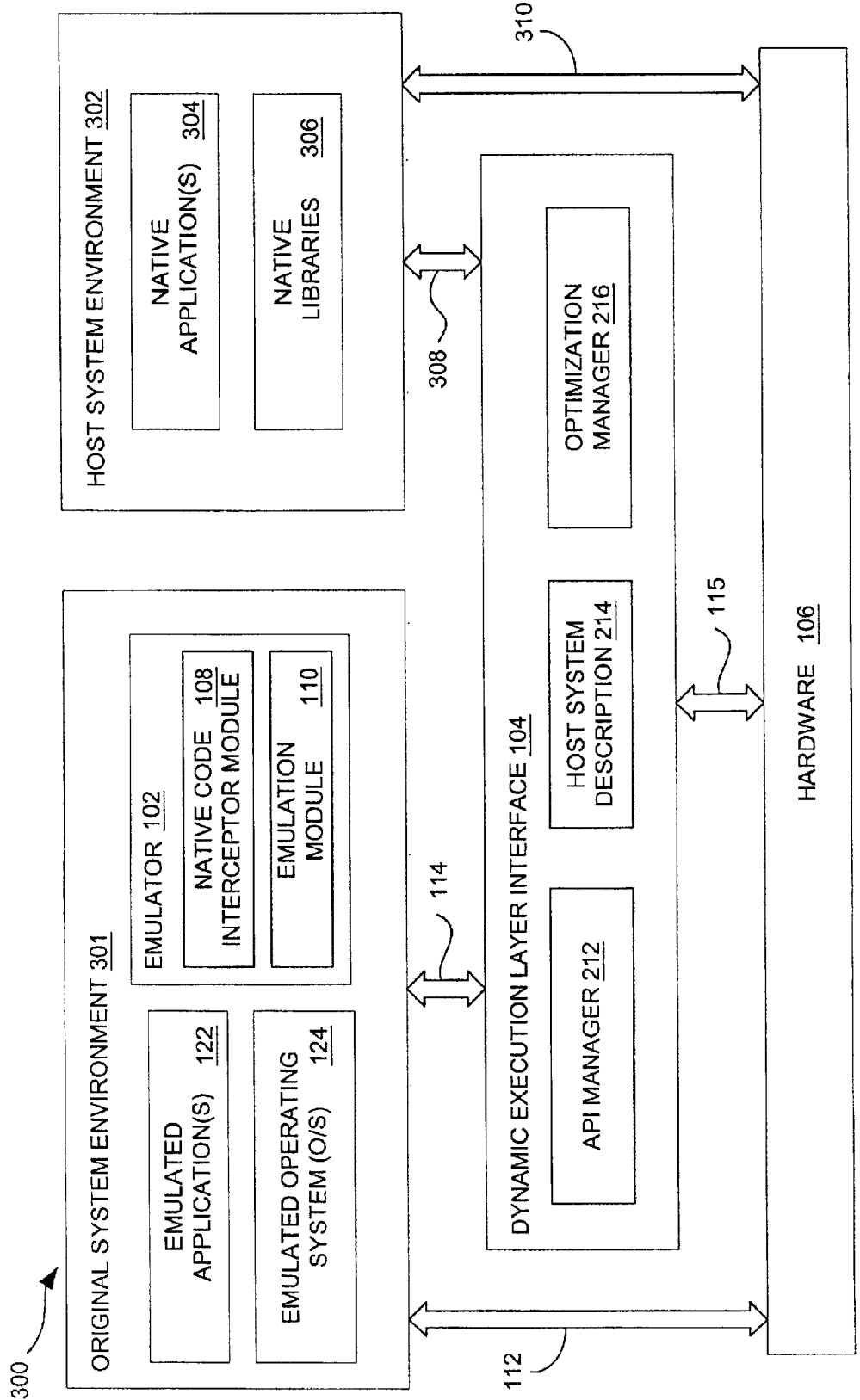
FIG. 3 is a more detailed block diagram of another embodiment of an emulation system according to the present invention for integrating native and emulated code in a virtual machine environment.

FIG. 3 is a more detailed block diagram of another embodiment of an emulation system 300 according to the present invention for integrating native and emulated code in a virtual machine environment. As illustrated in FIG. 3, emulation system 300 includes an original system environment 301 (emulated environment), a host system environment 302 (native environment), a DELI 104, and hardware 106. Emulated environment 301 is linked to DELI 104 via interface 114 and to hardware 106 via interface 112. Native environment 302 is linked to DELI 104 via interface 308 and to hardware 106 via interface 310. Accordingly, native environment 302 and emulated environment 301 may execute associated code on hardware 106 either directly or via an application program interface in DELI 104.

As described above, in certain embodiments emulation module 110 may implement an interpreter to provide emulation of the emulated system. As is generally known to persons having ordinary skill in the art, interpreters receive code, interpret it by determining the underlying semantics associated with the code, and carry out the semantic actions. An emulator/interpreter functionality may comprise an original system description that comprises the information about the instruction set of the original system hardware (i.e., that being emulated) that is needed to properly emulate the original system.

Generally speaking, an interpreter/emulator functionality emulates the hardware of the original computer system for which the software (e.g., a program) running on emulation system 300 was written. Accordingly, the interpreter/emulator functionality, from the perspective of a program executed by emulation system 300, performs all of the actions that the original hardware would have performed during native execution of the program.

As is suggested by its name, an interpreter/emulator functionality implements an interpreter to provide emulation of the original computer system. As is generally known to persons having ordinary skill in the art, interpreters receive code, interpret it by determining the underlying semantics associated with the code, and carry out the semantic actions. As known by those of ordinary skill in the art, an interpreter/emulator functionality normally comprises an original system description that comprises the information about the instruction set of the original system hardware (i.e., that being emulated) that is needed to properly emulate the original system. Although emulation module 110 may implement an interpreter/emulator, it is to be understood that in other embodiments emulation module 110 may comprise a different type of emulator, such as a translator/emulator. Furthermore, it is to be appreciated that emulation system 300 may also include a JIT compiler capable of providing this functionality.

In these embodiments, the interpreter/emulator functionality may be linked to the JIT compiler with an interface. As its name suggests, the JIT compiler is configured to provide run time compilation (i.e., translation) of software. More particularly, the JIT compiler provides binary translation of the program to be executed. In operation, the JIT compiler receives a representation of the program and translates it into an equivalent program (i.e., one having the same semantic functionality) for the target hardware of the host computer system. Similar to the interpreter/emulator functionality, the JIT compiler comprises a system description that comprises information about the instruction set of the original system hardware. The system description, however, comprises the information the JIT compiler needs to properly translate code into the desired form. In addition to the system description, the JIT compiler 104 may comprise a run time manager that, as is described below, permits the DELI 104 to invoke callback methods into the JIT compiler to, for instance, notify the JIT compiler as to the occurrence of certain events. When such callback methods are invoked, the run time manager is used to implement the callback methods.

Regardless of the particular method employed by emulator 102 to perform the emulation of the emulated code 116, emulator 102 is linked to DELI 104 with an API. This API facilitates communications between the emulator 102 and the DELI 104. Accordingly, the API may be used by the emulator 102 to access, for instance, code caching and linking services of the DELI 104 and can be used by the DELI to invoke the callback methods into the emulator 102. Referring again to FIG. 3, DELI 104 may comprise an application programming interface (API) manager 212, a host system description 214, and an optimization manager 216. The host system description 214 comprises the information that the DELI 104 needs about the host computer system such as its hardware, instruction set, etc. Operation of the API manager 212 and the optimization manager 216 is described in detail below.

Although not illustrated in FIG. 3, emulation system 300 may include a hardware abstraction module (HAM) to assist in the emulation of code to be emulated. In that the details of the configuration and operation of the HAM are not specifically relevant to the present disclosure, a detailed description of the HAM is not provided herein. However, it suffices to say that the HAM is generally configured to manage the hardware-related events (e.g., exceptions and interrupts) taking place on the host computer system and relevant to the execution of the code in the context of the original computer system that are to be emulated on the host computer system. The services of the HAM can be utilized by DELI 104 via the API.

Figure 4A:
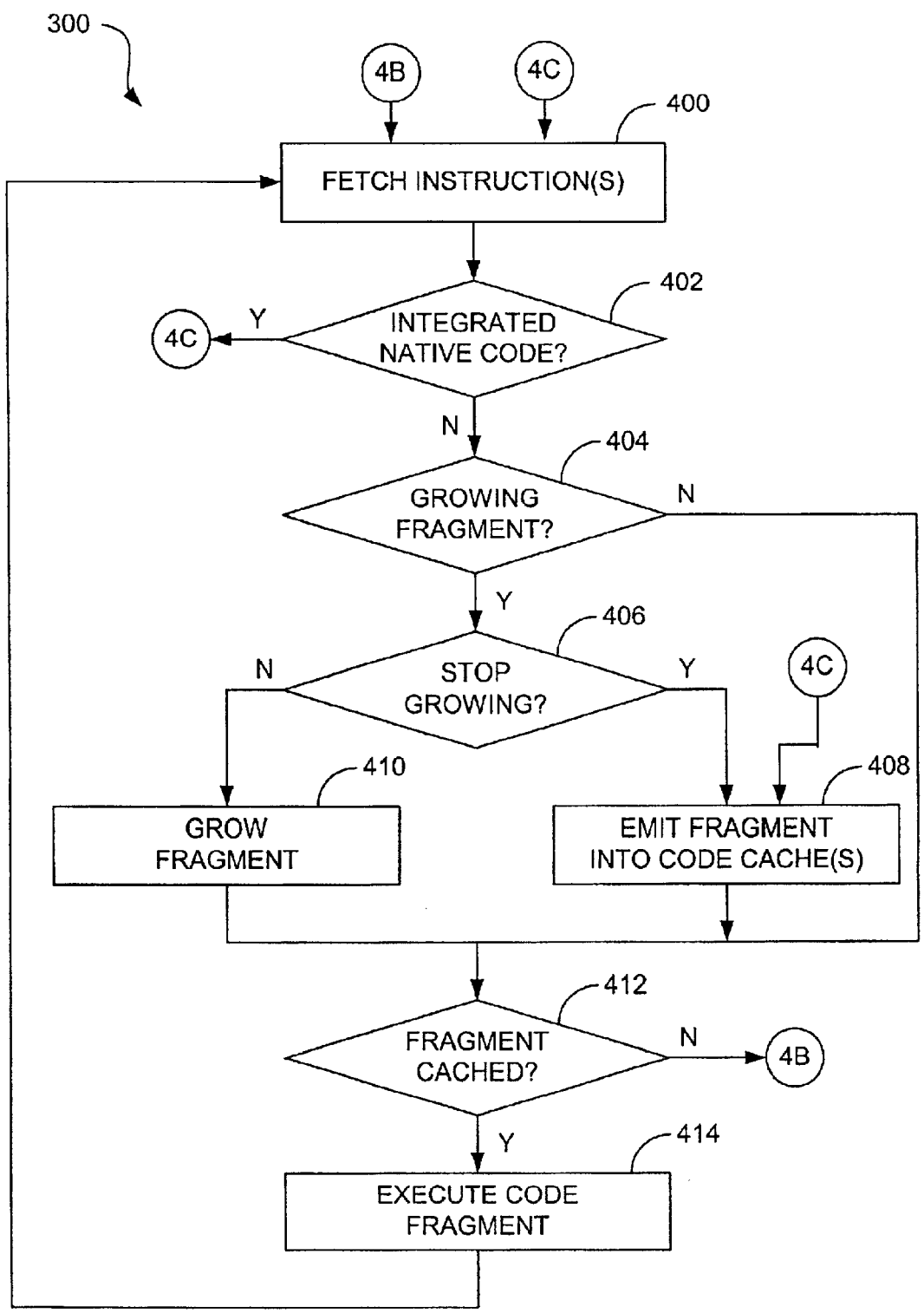
FIGS. 4A–4C are flow diagrams that illustrate the operation of the emulation system of FIG. 3.
Figure 4B:
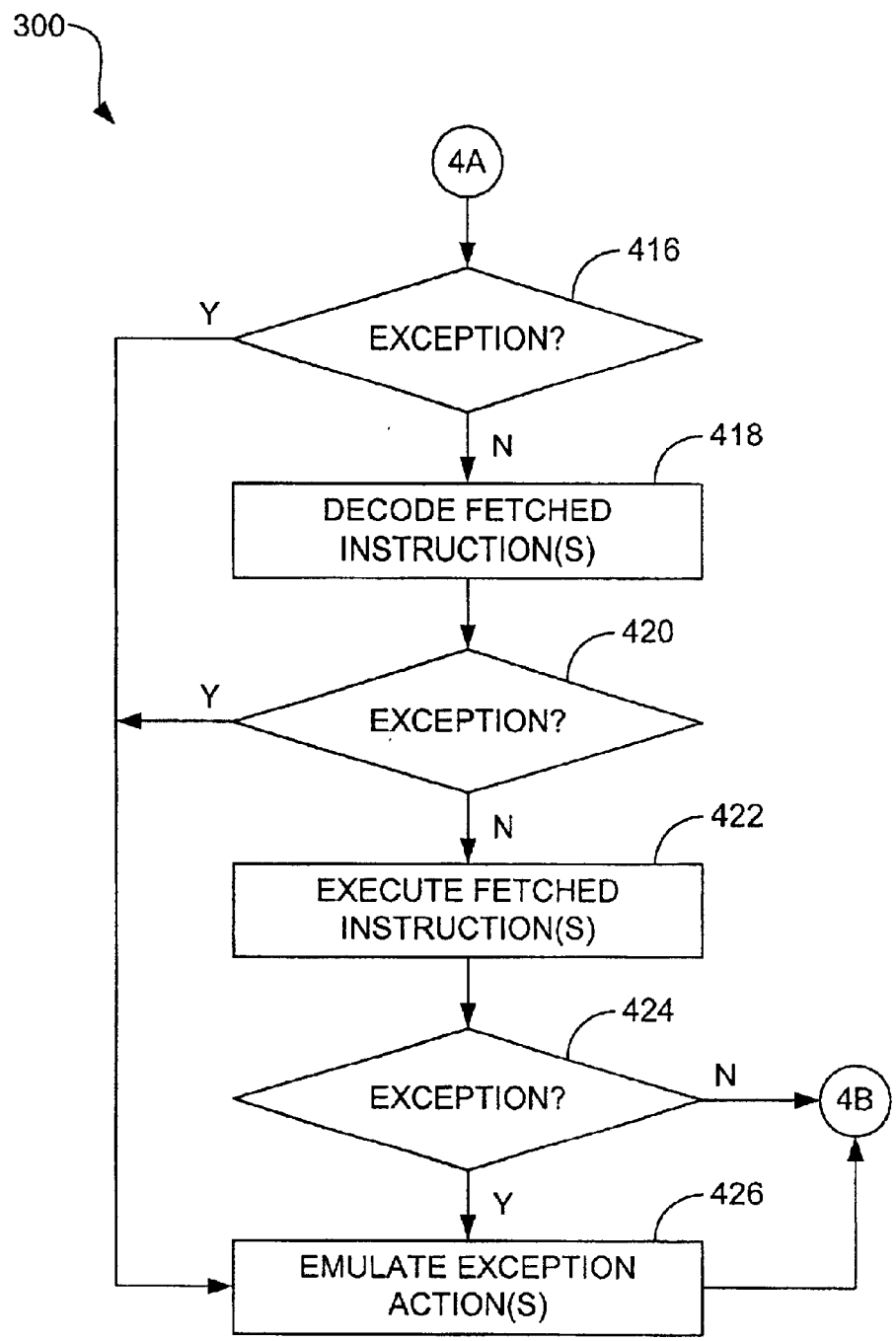
Figure 4C:
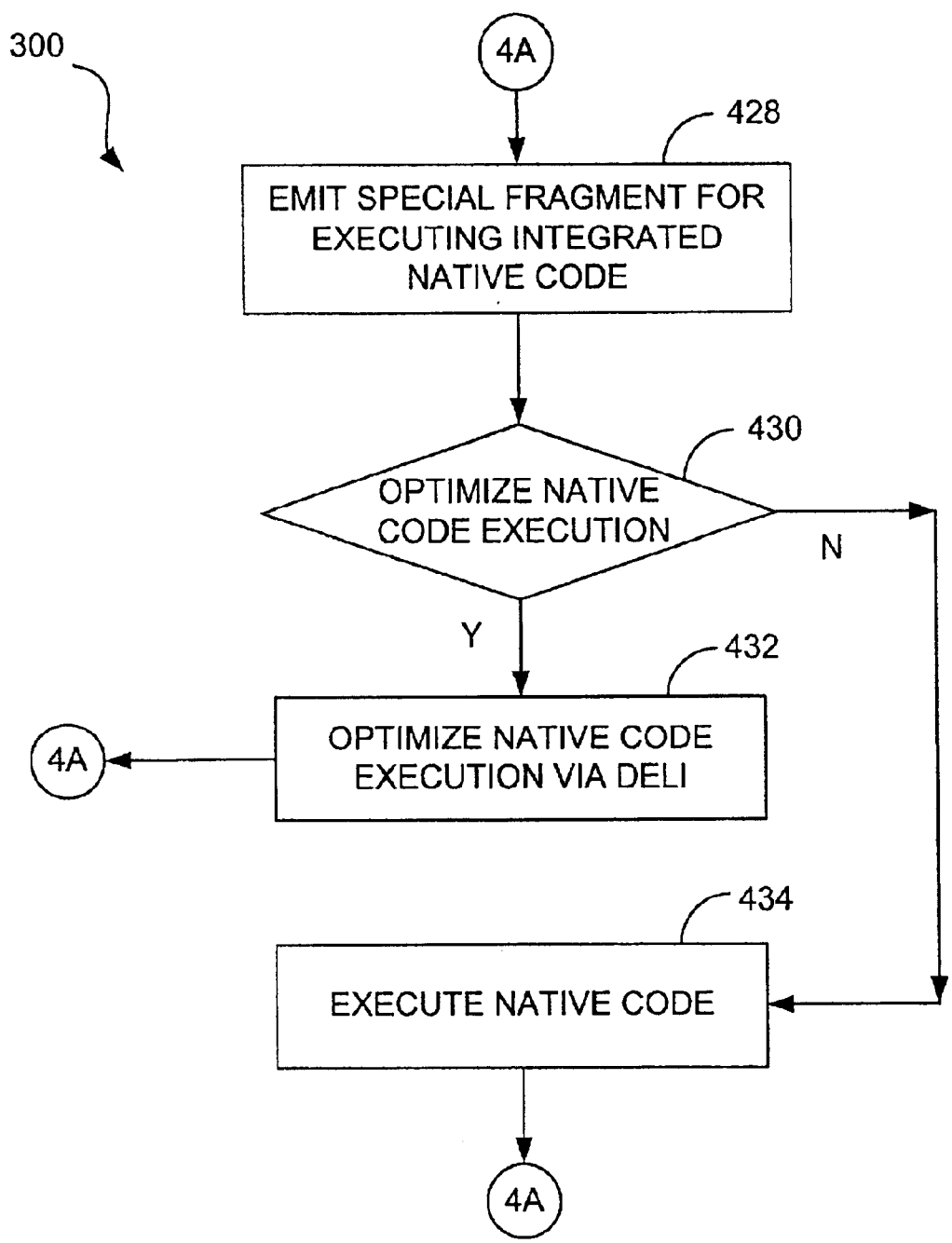

The general construction of emulation system 300 having been provided above, an example of operation of the system will now be provided in relation to FIGS. 4A–4C. Beginning with block 400 of FIG. 4A, one or more program instructions associated with emulated code 116 are first fetched from memory by emulator 102. This may comprise accessing the original memory address from the original computer system and using it to identify the actual location of the instruction(s) on the host computer system.

With reference to decision element 402, emulating system 300 determines whether the fetched instruction(s) correspond to native code 118 integrated with emulated code 116. One of ordinary skill in the art will appreciate that any of a variety of known and/or later-developed programming techniques may be implemented by emulating system 300 to detect native code 118. For instance, this functionality may be implemented with a wrapper function, native libraries, and/or an interface configured to bridge calling conventions associated with the native system and the emulated system.

By way of example, consider the situation in which the original computer system (emulated system) includes a compiler toolchain. In this situation, emulated system 300 may include a native compiler toolchain, which may be integrated with the compiler toolchain from the emulated system. This integrated toolchain may be configured to provide an interface or convention for enabling communication between the emulated system and the native system. For example, consider the situation in which a particular function ("Foo"), which is invoked in a program ("Main") by the emulated system and embedded in emulated code 116, could be more efficiently implemented natively on the host supporting the emulation (the native system). An illustrative example of the program Main be represented as follows:

```
Main( )
{
/* code compiled for the original system that will be emulated */
....
....
....
Foo(parameters list);
......
.....
....
}
```

The emulated system compiler may compile this code into a sequence of instructions for the processor of the emulated system by using a well-defined calling convention. The calling convention may specify, among other things, how to pass parameters to functions (e.g., in registers, on the stack, via a combination of the registers and the stack, etc.). An illustrative example of the compiled code may be represented as follows:

```
_Main:
# machine instructions for the original system that will be emulated
.....
....
....
Function call prolog instructions (e.g., set-up function parameters in
certain registers or load them on to the stack as specified by the calling
convention on the emulated system)
Call _Foo
Function call epilog instructions (e.g., load return parameters in certain
registers or load them from the stack as specified by the calling
convention on the emulated system)
....
....
}
```

Typically, if the function Foo was being compiled for the emulated system, it would contain a set of machine instructions, which may be represented as follows:

```
_Foo:
{
function prolog instructions (e.g., increment stack pointers, spill used
registers on to the stack, etc.)
function body instructions
function epilog instructions (e.g. load return value in certain registers,
restore previously spilled registers, restore the stack pointers, etc,)
}
```

In order to replace function Foo with a piece of code natively compiled (and therefore optimized) for the native system, an interface that takes care of bridging the two calling conventions (the one for the emulated system and the one for the native system supporting the emulation) may be implemented. As stated above, this may be achieved by wrapper functions that convert one calling convention into the other (and vice-versa if needed). For example, an emulated compiler toolchain may be extended with one or more tools (e.g., preprocessors configured to generate a function wrapper for functions that need be compiled for the native system and invoked by the emulated system.

In one embodiment, the emulator/translator running on the host system may be made aware of the need to take special actions during the process of emulating and/or translating from the emulated environment by using a special instruction or "sentinel" that otherwise has no meaning in the emulated system, (e.g., an undefined instruction code, instruction that is "illegal" to execute, etc.). Together with the special "sentinel," the wrapper may contain a descriptor block that specifies parameters to be passed to the native function from the emulated system and their location (e.g., registers or memory). This description may be embedded in the emulated code as data by using the emulated system toolchain support to do that or otherwise. For example, suppose the emulated system toolchain assembler (the utility that commonly converts assemble level code into machine object code) has a ".data" directive that allows a programmer to define an embedded constant. Following is an illustrative function wrapper for a function Foo:

```
_Foo:
# .data illegal instruction # for the sentinel or gateway to tell
# the emulator/translator which function is to be invoked natively;
# .data Native_Foo # address of Foo compiled natively
```

-continued

```
# .data 3 # number of parameters passed to the function
# description record for the first parameter
# .data 4 # size of this parameter (e.g., an integer)
# .data 5 # index of the register in the emulated system CPU used to
# pass this parameter
# .data x # additional information needed to convert the calling
# convention to the host system
# .data y
# .data z
# description record for the second parameter
. . . .
. . . .
. . .
# description record for the last parameter, etc.
```

Emulating system 300 may incorporate this scheme to integrate the two calling conventions and separate the knowledge of the emulated system from the calling convention and run-time architecture of the native system.

In the wrapper function described above, the record describing the call for the native system to properly translate the code, may contain a reference to the unction (e.g., "Native_Foo"). The reference to the function may be an alias (e.g., a data reference, etc.) that points to a storage area, which would appear as normal data (i.e., similar to global variable storage in memory) to the emulated system. This functionality may again be achieved by way of a simple tool integrated in the emulated compiler toolchain. The tool may be configured such that, when the function has been compiled natively by the native compiler (e.g., in the form of a position independent executable binary code), the compiled code will be packaged like a piece of data for the emulated system linker. In this manner, the reference to the function (Native_Foo) may be replaced with a location in memory in much the same manner as any other reference to data. For instance, the native compiler toolchain may generate a position independent binary containing, among other things, the function (e.g., Foo), which is able to run natively on the native system. Consider the situation in which the function has been compiled and placed in a binary file (e.g., "foo.bin"). The tool written for the emulated compiler toolchain may take this binary and produce an illustrative source file represented as follows:

```
Native_Foo[ ] = {
/* native instructions taken from foo.bin are used to initialize this array
*/
. . . .
. . . .
. . .
. . .
};
```

This file may then be compiled by the emulated compiler toolchain and linked with the rest of the application together with the function wrapper described above. In this manner, the native code may be stored together with the emulated system application code, or emulated code, in the form of, for example, an executable file. Furthermore, the emulated system linker may resolve the symbol Native_Foo contained in it.

It will be appreciated that other ways of embedding and integrating native code into the original system code may be employed. For example, in another embodiment, another sentinel instruction may be used to inform the emulation system that the instructions following the sentinel are native instructions that need to be executed on the native system hardware 106. In these embodiments, the emulator 102 may release control of the hardware 106 by executing those instructions until such a time as an event return control to the emulator 102 again. Such an event maybe defined as a particular hardware mechanism on the host computer that is reserved for this purpose. For example, in certain embodiments, the native code embedded in the original system application (emulated code) may use an illegal instruction, a software breakpoint, or a trap instruction when control has to be returned to the emulator 102 to resume the emulation process.

One of ordinary skill in the art will appreciate that the emulated to native interface may also work in the other direction, with minor modification, when invoking code in the emulated system from the host system being run natively.

In alternative embodiments, where the native code needs to access the emulated system memory, additional care may be taken so that when an exception results from an access to such memory, the exception is resolved in ways that are compatible with the emulated system. Furthermore, after the exception event(s) has been taken care of (e.g. by emulating the exception handler code in the emulated system), control may be returned to the native code that was running when the exception event was triggered.

For example, imaging the emulated system uses virtual memory and enables mapping of a virtual memory address to physical memory address (e.g. by using a hardware TLB (Translation Lookaside Buffer)). In the process of running the native function invoked from the emulated system code through the mechanism previously described, such a code may cause access of virtual memory whose translation may not have been provided by the emulated system. This may result in a missing translation exception, which to be correctly handled, needs to be converted into the emulated system equivalent exception. The problem is that the native code that generated this condition is not a translation from the emulated system code. As a result, the emulated code for the relevant exception handler cannot be handed a proper context for the emulated system. This can be solved by "faking" a surrogate context for the emulated system, which may be used as a "placeholder" for the emulated exception handler. This mechanism may be implemented by, for example, saving the native context at the time of the exception and storing it away for later when control is returned to it once the exception condition is resolved. Additionally, if multiple nested exceptions are possible in the emulated system, then multiple copies of the native context may be saved and restored later to handle the reentrancy.

Referring to FIG. 4C, during operation of emulating system 300, emulator 102 may detect the fetch of the special instruction and, at block 428, produce a special fragment of code that will convert the calling convention from the emulated system to the calling convention for the native system, along with a native function call to the Native_Foo code loaded in the storage allocated for the emulated memory (e.g., loaded together with the emulated application code by the emulated O/S).

As represented by decision block 430 and blocks 432 and 434, the special fragment may be emitted and executed in the code cache of DELI 104, and possibly linked with other fragments already active in the code cache. The operation of DELI 104 is described in detail below. Before executing the special fragment (which contains the call to the Native_Foo function), emulating system 300 may also make a call to DELI 104. The call to DELI 104 may, for example, activate the DELI transparent mode in such a way as to automatically insert native fragments of code from the function Native_Foo (and other native functions invoked by it) in the code cache. The native fragments of code inserted into DELI 104 may also be optimized by DELI 104 as described in detail below.

Referring again to FIG. 4A, the emulation portion of emulating system 300 will be described. At decision block 402, if the fetched instructions are not associated with native code, emulation module 110 determines whether emulation system 300 is currently growing a code fragment by linking various program instructions together. As is known in the art, such linking is typically performed to increase execution efficiency of the code. If the system is not currently growing a code fragment, for instance a machine state exists in which emulator 102 is not able to grow a fragment, flow continues to decision block 412 described below. If, on the other hand, the system 300 is growing a code fragment, flow continues to decision block 406, at which the emulator 102 determines whether to continue growing the code fragment (by adding the fetched instruction(s) to the fragment) or stop growing the code fragment. This determination is made in view of certain internal criteria. For example, the emulator 102 may be configured to grow a fragment until a basic block of code containing a branch (i.e., control flow instructions) is obtained.

If the emulator 102 determines not to stop growing the fragment (i.e., to continue growing the fragment), flow continues to block 410, at which the fragment is grown, i.e. where the fetched program instruction(s) is/are added to the fragment that is being grown. If the emulator 102 determines to stop growing the fragment, however, flow continues to block 408, at which a translation for the existing code fragment is emitted into a code cache of the DELI 104 via the API. A detailed discussion of the manner in which such code fragments can be emitted to the DELI 104 is provided below. As is explained in that description, once the code fragment has been cached in the DELI 104, it can be executed natively from the DELI code cache(s) when the semantic function of the original code is required. Such operation permits greatly improved efficiency in executing the program on the host computer in that the overhead associated with translating the original code is avoided the next time the semantic function is required. In addition to emitting code fragment to the code cache(s), the emulator 102 associates the original instruction(s) with the emitted fragment with an identifier such as a tag so that the emulator will know that a translation for the original program instruction(s) already resides in the code cache(s) of the DELI 104. Once the code has been cached, it can be linked according to various policies provided to the DELI 104 to further increase system efficiency.

Irrespective of whether fragment growth is continued or whether a translation for the code fragment is emitted, flow next continues to decision block 412, at which the emulating system 300 determines whether a translation of the fetched instruction(s) has been cached, i.e. is contained within a code cache of the DELI 104. If so, execution then jumps to the code cache(s) of the DELI 104 and the translated code fragment is executed natively, as indicated in block 414. Execution continues in the code cache(s) until such time when a reference to code not contained therein (e.g., a cache miss) is encountered. At this point, flow returns to block 400 and the next program instruction(s) is/are fetched.

Returning to decision block 412, if a translation of the fetched instruction(s) has not been cached, flow returns to the emulator 102, which is illustrated in FIG. 4B. Beginning with decision block 416, emulator 102 determines whether the instruction fetching action that was conducted in block 400 would have created an exception in the emulated system. By way of example, such an exception could have arisen where there was no permission to access the portion of memory at which the instruction(s) would have been located. This determination is made with reference to the information contained within the system description mentioned above. If such an exception would have occurred, flow continues down to block 426, at which the exception action or actions that would have been taken by the original computer system is/are emulated by the emulator 102 for the benefit of the program.

Assuming no exception arose at decision block 416, flow continues to block 418, at which the fetched instruction(s) is/are decoded by the emulator 102. Generally speaking, this action comprises interpreting the nature of the instruction(s), i.e. the underlying semantics of the instruction(s). Next, with reference to decision block 420, it can again be determined whether an exception would have occurred in the emulated system. Specifically, it is determined whether the instruction(s) would have been illegal in the original system. If so, flow continues to block 426 and the exception action(s) that would have been taken by the original computer system are emulated. If not, however, flow continues to block 422, at which the semantics of the fetched instruction(s) are executed by the emulator 102 to emulate actual execution of the instruction(s) by the emulated system. At this point, with reference to decision block 424, it can once again be determined whether an exception would have arisen in the emulated system. In particular, it can be determined whether it would have been illegal to execute the instruction(s) in the emulated system. If an exception would have arisen, flow continues to block 426. If no exception would have arisen, however, flow returns to block 400 and one or more new program instructions are fetched.

Notably, in the initial stages of operation of the system 300, i.e. when emulation is first provided for the program, most execution is conducted by the emulator 102 in that little or no code resides within (i.e., has been emitted into) the code cache(s) of the DELI 104. However, in a relatively short amount of time, most if not all execution is conducted within the code cache(s) of the DELI 104 due to the emitting step (block 408). By natively executing code within the code cache(s), the overhead associated with interpreting and emulating is avoided (in that it has already been performed), thereby greatly increasing emulation efficiency.

Figure 5:
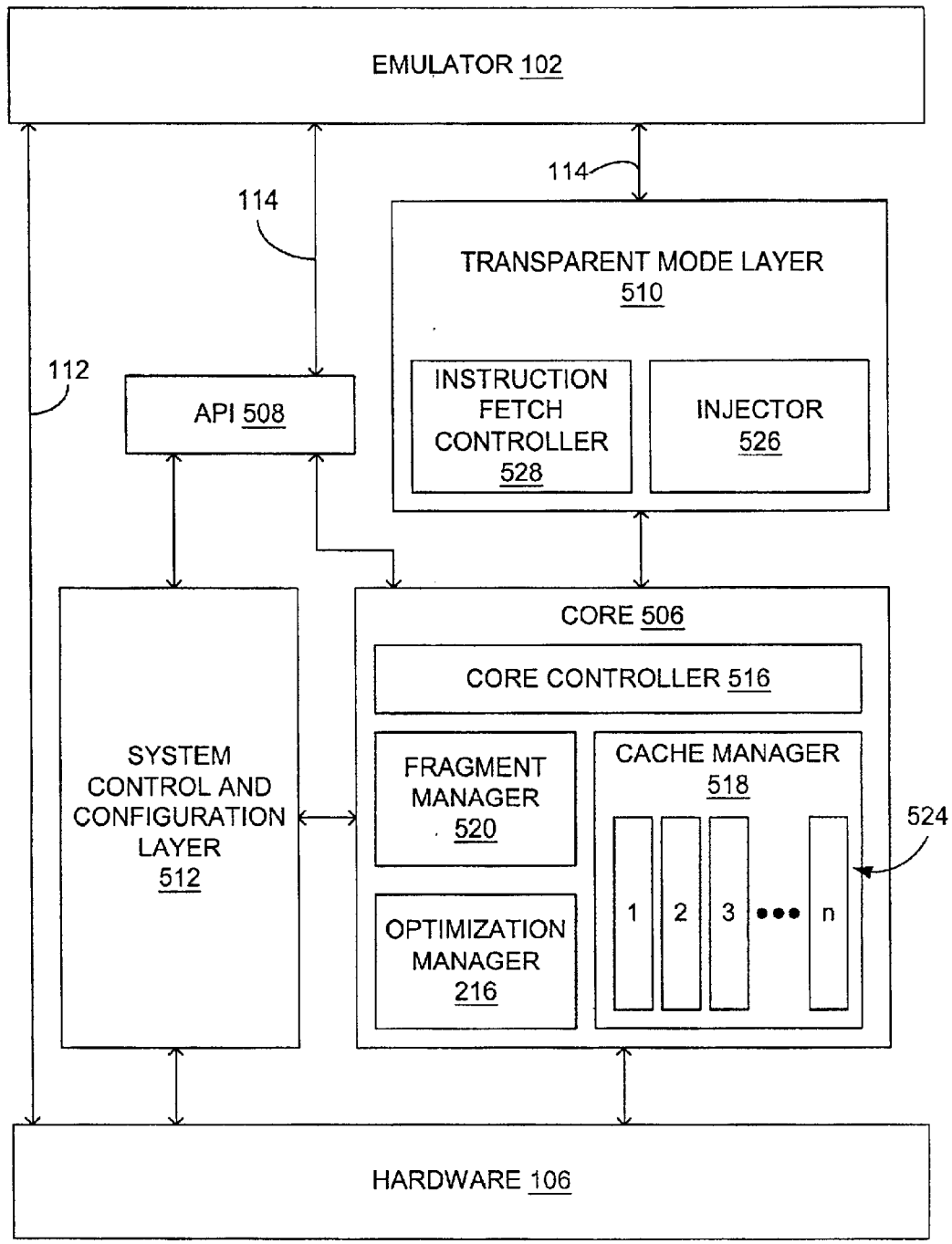
FIG. 5 is a block diagram illustrating an embodiment of the dynamic execution layer interface (DELI) of FIGS. 1 and 3.

As described above, emulation efficiency and/or the efficiency of executing native code is significantly increased due to the provision of the DELI 104. FIG. 5 illustrates an example configuration for the DELI 104. Generally speaking, the DELI 104 comprises a generic software layer written in a high or low level language that resides between applications, including or not including an operating system (O/S), and hardware to untie application binary code from the hardware. Through this arrangement, the DELI 104 can provide dynamic computer program code transformation, caching, and linking services, which can be used in a wide variety of different applications such as emulation, dynamic translation and optimization, transparent remote code execution, remapping of computer system functionality for virtualized hardware environments program, code decompression, code decrypting, etc. Generally speaking, the DELI 104 can provide its services while operating in a transparent mode, a nontransparent mode, or combinations of the two. In the transparent mode, the DELI 104 automatically takes control of an executing program in a manner in which the executing program is unaware that it is not executing directly on computer hardware. In the nontransparent mode, the DELI 104 exports its services through the API 508 to the application (client), such as emulator 102, to allow the application to control how the DELI reacts to certain system events.

As depicted in FIG. 5, the DELI 104 resides between at least one application (program) and computer hardware 106 of the native system. In that the application was written for the original computer system that is being emulated, the application is unaware of the DELI's presence. Underneath the application resides a client which, in this case, comprises the emulator 102. Unlike the application, the client is aware of the DELI 104 and is configured to utilize its services.

The DELI 104 can include four main components including a core 506, an API manager 212, a transparent mode layer 510, and a system control and configuration layer 512. Generally speaking, the core 506 exports two primary services to both the API manager 122 (and therefore to the API 508) and the transparent mode layer 510. The first of these services pertains to the caching and linking of native code fragments or code fragments which correspond to the instruction set of the hardware 106. The second pertains to executing previously cached code fragments. The API manager 212 exports functions to the client (e.g., emulator 102) that provide access to the caching and linking services of the core 506 in the nontransparent mode of operation. The transparent mode layer 510, where provided, enables the core 506 to gain control transparently over code execution in the transparent mode of operation as well as fetch code fragments to be cached. Finally, the system control and configuration layer 512 enables configuration of the DELI 104 by providing policies for operation of the core 506 including, for example, policies for the caching, linking, and optimizing of code. These policies can, for example, be provided to the layer 512 from the client via the API manager 212. The system control and configuration layer 512 also controls whether the transparent mode of the DELI 104 is enabled, thus determining whether the core 506 receives input from the API manager 212, the transparent mode layer 510, or both. As is further indicated in FIG. 5, the system 300 can include a bypass path 112 that can be used by the application to bypass the DELI 104 so that the application can execute directly on the hardware 104, where desired.

As is shown in FIG. 5, the core 506 comprises a core controller 516, a cache manager 518, a fragment manager 520, and the optimization manager 216 (FIG. 3). The core controller 516 functions as a dispatcher that assigns tasks to the other components of the core 506 that are responsible for completing the tasks. The cache manager 518 comprises a mechanism (e.g., set of algorithms) that controls the caching of the code fragments within one or more code caches 524 (e.g., caches 1 through n) according to the policies specified by the system control and configuration layer 512, as well as the fragment manager 520 and the optimization manager 216. The one or more code caches 524 of the core 506 can, for instance, be located in hardware caches on one or more processors of the hardware 106, or can be created in the main local memory of the hardware. Where the code cache(s) 524 is/are mapped in hardware caches onboard the processor(s), greatly increased performance can be obtained due to reduced instruction cache refill overhead, increased memory bandwidth, etc. The fragment manager 520 specifies the arrangement of the code fragments within the code cache(s) 524 and the type of transformation that is imposed upon the fragments. Finally the optimization manager 216 contains the set of optimizations that can be applied to the code fragments to optimize their execution.

As noted above, the API manager 212 exports functions to the application that provide access to DELI services. More specifically, the API manager 212 exports caching and linking services of the core 506 to the client (e.g., emulator 102) via the API 508. These exported services enable the client to control the operation of the DELI 104 in the nontransparent mode by, for example, explicitly emitting code fragments to the core 506 for caching and instructing the DELI 104 to execute specific code fragments out of its code cache(s) 524. In addition, the API manager 212 also can export functions that initialize and discontinue operation of the DELI 104. For instance, the API manager 212 can initiate transparent operation of the DELI 104 and further indicate when the DELI is to cease such operation. Furthermore, the API manager 212 also, as mentioned above, facilitates configuration of the DELI 104 by delivering policies specified by the client to the core 506 (e.g., to the fragment manager 520 and/or the optimization manager 216).

With further reference to FIG. 5, the transparent mode layer 510 can include an injector 526 that can be used to gain control over an application transparently. When the DELI 104 operates in a completely transparent mode, the injector 526 is used to inject the DELI into the application before the application begins execution so that the application can be run under DELI control. Control can be gained by the injector 526 in several different methods, each of which loads the application binaries without changing the virtual address at which the binaries are loaded. Examples these methods are described in U.S. patent application Ser. No. 09/924,260, filed Aug. 8, 2001, entitled "Dynamic Execution Layer Interface for Explicitly of Transparently Executing Application or System Binaries", which is hereby incorporated by reference into the present disclosure. In the emulation context, however, such completely transparent operation is typically not used in that the client is configured to use the DELI's services in an explicit manner.

As noted above, the system control and configuration layer 512 enables configuration of the DELI 104 by providing policies for various actions such as the caching and linking of code. More generally, the policies typically determine how the DELI 104 will behave. For instance, the layer 512 may provide policies as to how fragments of code are extracted from an application, how fragments are created from the original code, how multiple code fragments can be linked together to form larger code fragments, etc. The layer's policies can be static or dynamic. In the former case, the policies can be hardcoded into the DELI 104, fixing the configuration at build time. In the latter case, the policies can be dynamically provided by the client through function calls in the API 508. Implementation of the policies can control the manner in which the DELI 104 reacts to specific system and/or hardware events (e.g., exceptions and interrupts). In addition to the policies noted above, the system control and configuration layer 512 can specify the size of the code cache(s) 524, whether a log file is created, whether code fragments should be optimized, etc.

Figure 6:
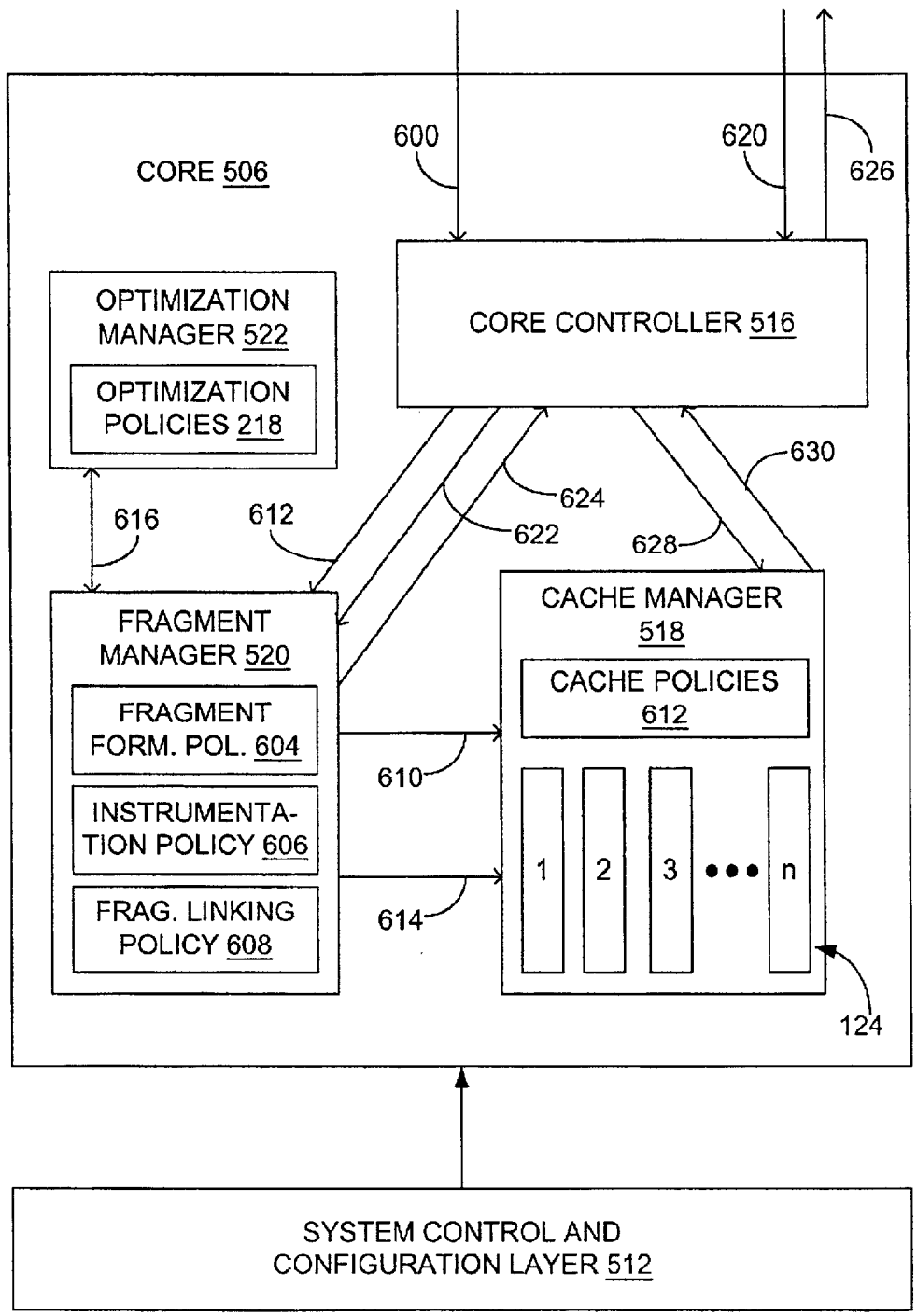
FIG. 6 is a block diagram illustrating an embodiment of the core of the DELI of FIG. 5.

FIG. 6 illustrates an example configuration of the core 506 and its operation. As indicated in FIG. 6, the core 506 accepts two primary types of requests from the API manager 212 or the transparent mode layer 510. First, requests 600 can be accepted for caching and linking a code fragment through a function interface. In its most basic form, such a request can comprise a function in the form of, for instance, "Deli_emit_fragment (tag)", which receives a code fragment as its parameters and an identifier (e.g., tag) to store in the DELI cache(s) 524. In another example, the core 506 can accept requests for initiating execution at a specific code fragment tag through a function interface such as "Deli_exec_fragment (tag)", which identifies a code fragment stored in the cache(s) 524 to pass to the hardware 106 for execution.

The core controller 516 processes these requests and dispatches them to the appropriate core module. A request 602 to emit a code fragment with a given identifier can then be passed to the fragment manager 520. The fragment manager 520 transforms the code fragment according to its fragment formation policy 604, possibly instruments the code fragment according to its instrumentation policy 606, and links the code fragment together with previously cached fragments according to its fragment linking policy 408. For example, the fragment manager 318 may link multiple code fragments in the cache(s) 524, so that execution jumps to another code fragment at the end of executing a code fragment, thereby increasing the length of execution from the cache(s). To accomplish this, the fragment manager 520 issues fragment allocation instructions 610 to the cache manager 518. The fragment manager 520 then sends a request to the cache manager 518 to allocate the processed code fragment in the code cache(s) 524.

The cache manager 518 controls the allocation of the code fragments and typically is equipped with its own cache policies 612 for managing the cache space. However, the fragment manager 520 may also issue specific fragment deallocation instructions 614 to the cache manager 520. For example, the fragment manager 520 may decide to integrate the current fragment with a previously allocated fragment, in which case the previous fragment may need to be deallocated. In some arrangements, the cache manager 518 and fragment manager 520 can manage the code cache(s) 524 and code fragments in the manner shown and described in U.S. Pat. No. 6,237,065, issued May 22, 2001, entitled "A Preemptive Replacement Strategy for a Caching Dynamic Translator Based on Changes in the Translation Rate," which is hereby incorporated by reference into the present disclosure. Alternatively, management of the code cache(s) 320 and code fragments may be performed in the manner shown and described in U.S. patent application Ser. No. 09/755,389, filed Jan. 5, 2001, entitled "A Partitioned Code Cache Organization to Exploit Program Locality," which is also hereby incorporated by reference into the present disclosure.

Prior to passing a fragment to the cache manager 518, the fragment manager 520 may pass (616) the fragment to the optimization manager 212 to improve the quality of the code fragment according to its optimization policies 618. In some arrangements, the optimization manager 212 may optimize code fragments in the manner shown and described in U.S. patent application Ser. No. 09/755,381, filed Jan. 5, 2001, entitled "A Fast Runtime Scheme for Removing Dead Code Across Linked Fragments," which is hereby incorporated by reference into the present disclosure. Alternatively, the optimization manager 126 may optimize code fragments in the manner shown and described in U.S. patent application Ser. No. 09/755,774, filed Jan. 5, 2001, entitled "A Memory Disambiguation Scheme for Partially Redundant Load Removal," which is also hereby incorporated by reference into the present disclosure. Notably, the optimization manager 126 may also optimize code fragments using classical compiler optimization techniques, such as elimination of redundant computations, elimination of redundant memory accesses, inlining functions to remove procedure call/return overhead, dead code removal, implementation of peepholes, etc. Typically, the optimization manager 212 deals with an intermediate representations (IRs) of the code that is to be optimized. In such an arrangement, the client may be aware of that IR code is needed and can call upon the API 508 to translate code from native to IR for purposes of optimization, and back again to native once the optimization(s) has been performed.

As mentioned above, the fragment manager 520 transforms the code fragment according to its fragment formation policy 604. The transformations performed by the fragment manager 520 can include code relocation by, for instance, changing memory address references by modifying relative addresses, branch addresses, etc. The layout of code fragments may also be modified, changing the physical layout of the code without changing its functionality (i.e., semantics). These transformations are performed by the fragment manager 520 on fragments received through the API 508 and from the instruction fetch controller 528 of the transparent mode layer 510.

As identified above, the other primary type of request accepted by the DELI core 506 is a request 620 to execute a fragment identified by a given identifier (e.g., tag). In such a case, the core controller 516 issues a lookup request 622 to the fragment manager 520, which returns a corresponding code cache address 624 if the fragment is currently resident and active in the cache(s) 524. By way of example, the fragment manager 520 can maintain a lookup table of resident and active code fragments in which a tag can be used to identify the location of a code fragment. Alternatively, the fragment manager 520 or cache manager 518 can use any other suitable technique for tracking whether code fragments are resident and active. If the fragment is not currently resident and active in the cache(s) 320, the fragment manager 520 returns an error code to the core controller 516, which returns (626) the fragment tag back to the initial requester as a cache miss address. If, on the other hand, the fragment is currently resident and active, the core controller 516 then patches (628) the initial request to the cache manager 518 along with its cache address. The cache manager 518, in turn, transfers control to the addressed code fragment in its code cache(s) 524, thus executing the addressed code fragment. Execution then remains focused in the code cache(s) 524 until a cache miss occurs, i.e., until a copy for the next application address to be executed is not currently resident in the cache(s). This condition can be detected, for instance, by an attempt of the code being executed to escape from the code cache(s) 524. A cache miss is reported (630) from the cache manager 518 to the core controller 516 and, in turn, back (626) to the initial requester.

Although two primary requests have been identified above in relation to FIG. 6 (i.e., emitting and executing), it is to be understood that many other types of requests may be made, particularly when emulating a computer system as described above.

Figure 7:
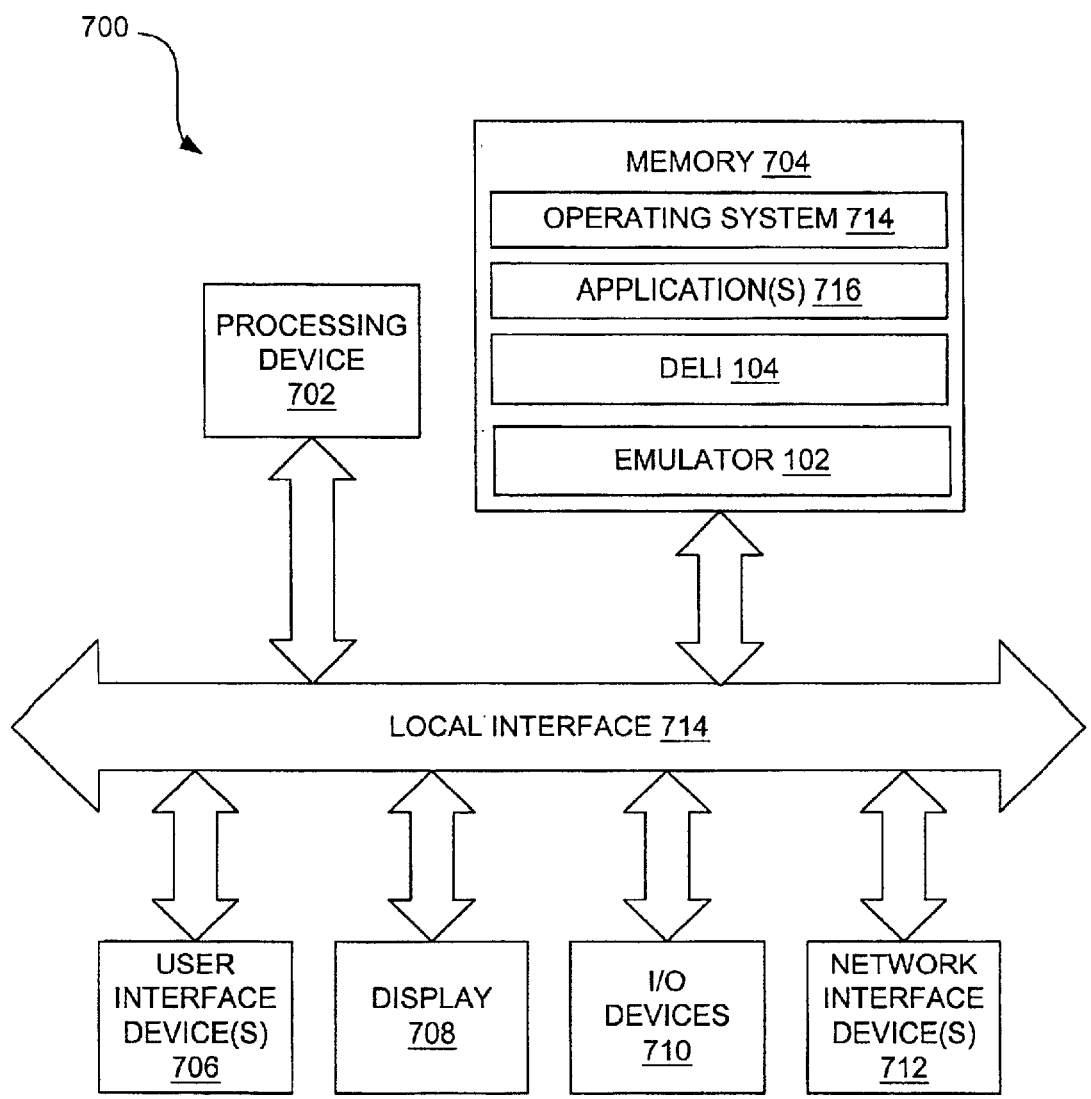
FIG. 7 is a block diagram of an embodiment of a host computer system configured to implement the emulation system of FIGS. 1 and 3.

FIG. 7 is a block diagram illustrating an example host computer system 700 on which emulation systems 100 and 300 may be executed. Generally speaking, the computer system 700 can comprise any one of a wide variety of wired and/or wireless computing devices, such as a desktop computer, portable computer, dedicated server computer, multi-processor computing device, cellular telephone, personal digital assistant (PDA), handheld or pen-based computer, and so forth. Irrespective its specific arrangement, the computer system 700 can, for instance, comprise a processing device 702, memory 704, one or more user interface devices 706, a display 708, one or more input/output (I/O) devices 710, and one or more networking devices 712, each of which is connected to a local interface 714.

The processing device 702 can include any custom made or commercially available processor, a central processing unit (CPU) or an auxiliary processor among several processors associated with the computer system 700, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 704 can include any one of a combination of volatile memory elements (e.g., random access memory (RAM, such as DRAM, SRAM, etc.)) and nonvolatile memory elements (e.g., ROM, hard drive, tape, CDROM, etc.). The memory 704 typically comprises an operating system 714, one or more applications 716, DELI 104, and an emulator 102 as described above. One of ordinary skill in the art will appreciate that the memory 704 can, and typically will, comprise other components which have been omitted for purposes of brevity.

The one or more user interface devices 706 comprise those components with which the user can interact with the computing system 700. For example, where the computing system 700 comprises a personal computer (PC), these components can comprise a keyboard and mouse. Where the computing system 700 comprises a handheld device (e.g., PDA, mobile telephone), these components can comprise function keys or buttons, a touch-sensitive screen, a stylus, etc. The display 708 can comprise a computer monitor or plasma screen for a PC or a liquid crystal display (LCD) for a handheld device.

With further reference to FIG. 7, the one or more I/O devices 710 are adapted to facilitate connection of the computing system 700 to another system and/or device and may therefore include one or more serial, parallel, small computer system interface (SCSI), universal serial bus (USB), IEEE 1394 (e.g., Firewire™), and/or personal area network (PAN) components. The network interface devices 712 comprise the various components used to transmit and/or receive data over a network. By way of example, the network interface devices 712 include a device that can communicate both inputs and outputs, for instance, a modulator/demodulator (e.g., modem), wireless (e.g., radio frequency (RF)) transceiver, a telephonic interface, a bridge, a router, network card, etc.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for emulating code from an original computer system on a host computer system, the method comprising the steps of:
   fetching a program instruction associated with program code to be emulated on a host computer system;
   determining whether the program instruction is to be executed natively on the host computer system or is to be emulated on the host computer system; and
   if the program instruction is to be executed natively on the host computer system, emitting a native code fragment associated with the program instruction into a dynamic execution layer interface to be executed.

2. The method of claim 1, wherein the step of fetching a program instruction comprises fetching a program instruction with an emulator.

3. The method of claim 2, wherein the emulator is an interpreter/emulator.

4. The method of claim 1, wherein the step of emitting a native code fragment occurs via an application program interface associated with the dynamic execution layer interface.

5. The method of claim 1, wherein the step of determining whether the program instruction is to be executed natively on the host computer system comprises interfacing a first calling convention associated with an original computer system and a second calling convention associated with the host computer system.

6. The method of claim 1, wherein the step of determining whether the program instruction is to be executed natively on the host computer system comprises detecting a sentinel instruction.

7. The method of claim 1, further comprising the step of determining the native code fragment by receiving a data reference to a function that is to be run natively on the host computer system.

8. The method of claim 7, further comprising the step of determining the native code fragment by receiving a location in memory where native code is located.

9. A system for emulating code from an original computer system on a host computer system, the system comprising:

means for fetching a program instruction associated with program code to be emulated on a host computer system;

means for determining whether the program instruction is to be executed natively on the host computer system or is to be emulated on the host computer system; and means for emitting a native code fragment associated with the program instruction into a dynamic execution layer interface to be executed in the event that the program instruction is to be executed natively on the host computer system.

10. The system of claim 9, wherein the means for fetching a program instruction comprises an emulator.

11. The system of claim 9, wherein the means for emitting a native code fragment comprises an application program interface associated with the dynamic execution layer interface.

12. The system of claim 9, wherein the means for determining comprises a programming method for interfacing a first calling convention associated with an original computer system and a second calling convention associated with the host computer system.

13. The system of claim 9, further comprising means for receiving a data reference to a function that is to be run natively on the host computer system.

14. The system of claim 9, wherein the means for determining a native code fragment comprises a location in memory where native code is located.

15. An emulation program configured to emulate an original computer system for which a program was written, the emulation program stored on a computer-readable medium and comprising:

logic configured to fetch a program instruction associated with program code to be emulated on a host computer system;

logic configured to determine whether the program instruction is to be executed natively on the host computer system or is to be emulated on the host computer system; and logic configured to emit a native code fragment associated with the program instruction into a dynamic execution layer interface to be executed in the event the program instruction is to be executed natively on the host computer system.

16. The emulation program of claim 15, wherein the emitting logic is further configure to emit the native code fragment via an application program interface associated with the dynamic execution layer interface.

17. The emulation program of claim 15, wherein the determining logic is further configured to provide an interface between a first calling convention associated with an original computer system and a second calling convention associated with the host computer system.

18. The emulation program of claim 15, wherein the determining logic is further configured to detect a sentinel instruction.

19. The emulation program of claim 15, wherein the determining logic is further configured to receive a data reference a location in memory where native code is located.

20. A system for emulating code from an original computer system on a host computer system, the system comprising:

an emulator configured to fetch instructions associated with a program written to be executed on an original computer system, the emulator comprising an emulation module configured to execute instructions by emulating the original computer system and a native code interceptor module configured to detect instructions that are to be executed natively instead of emulated;

a dynamic execution layer interface including a core having at least one code cache in which code fragments can be cached and executed; and an application programming interface that links the emulator to the dynamic execution layer interface.

21. The system of claim 20, wherein the emulator comprises an interpreter/emulator.

22. The system of claim 21, wherein the emulator further comprises a just-in-time compiler.

23. The system of claim 20, wherein the application programming interface comprises a set of functions available to the emulator including an emit fragment function with which the emulator can emit code fragments into the at least one code cache and an execute function with which the emulator can request execution of code fragments contained within the at least one code cache.

* * * * *

UNITED STATES PATENT AND TRADEMARK OFFICE
CERTIFICATE OF CORRECTION

| | | |
|---|---|---|
| PATENT NO. | : 6,907,519 B2 | Page 1 of 1 |
| APPLICATION NO. | : 10/100874 | |
| DATED | : June 14, 2005 | |
| INVENTOR(S) | : Giuseppe Desoli | |

It is certified that error appears in the above-identified patent and that said Letters Patent is hereby corrected as shown below:

In column 9, line 22, delete "unction" and insert -- function --, therefor.

Signed and Sealed this

Fourth Day of August, 2009

JOHN DOLL
*Acting Director of the United States Patent and Trademark Office*